United States Patent
Narasimhan et al.

(10) Patent No.: US 10,218,728 B2
(45) Date of Patent: Feb. 26, 2019

(54) ANOMALY DETECTION FOR WEB DOCUMENT REVISION

(71) Applicant: eBay Inc., San Jose, CA (US)

(72) Inventors: Lakshmi Narasimhan, Bangalore (IN); Himanshu Jain, Sikar (IN)

(73) Assignee: eBay Inc., San Jose, CA (US)

( * ) Notice: Subject to any disclaimer, the term of this patent is extended or adjusted under 35 U.S.C. 154(b) by 190 days.

(21) Appl. No.: 15/188,532

(22) Filed: Jun. 21, 2016

(65) Prior Publication Data

US 2017/0366568 A1 Dec. 21, 2017

(51) Int. Cl.
| | |
|---|---|
| *G06F 17/16* | (2006.01) |
| *H04L 29/06* | (2006.01) |
| *G06F 17/30* | (2006.01) |
| *G06K 9/00* | (2006.01) |
| *G06K 9/46* | (2006.01) |
| *H04L 29/08* | (2006.01) |
| *G06K 9/62* | (2006.01) |

(52) U.S. Cl.
CPC .......... *H04L 63/1425* (2013.01); *G06F 17/16* (2013.01); *G06F 17/30* (2013.01); *G06K 9/00483* (2013.01); *G06K 9/4671* (2013.01); *G06K 9/6215* (2013.01); *H04L 67/02* (2013.01)

(58) Field of Classification Search
None
See application file for complete search history.

(56) References Cited

U.S. PATENT DOCUMENTS

| | | |
|---|---|---|
| 6,219,818 B1 | 4/2001 | Freivald et al. |
| 6,654,743 B1 | 11/2003 | Hogg et al. |
| 7,051,328 B2 | 5/2006 | Rai et al. |
| (Continued) | | |

FOREIGN PATENT DOCUMENTS

WO 2017/223230 A1 12/2017

OTHER PUBLICATIONS

International Search Report received for PCT Application No. PCT/US2017/038593, dated Sep. 11, 2017, 3 pages.
(Continued)

*Primary Examiner* — Jason K Gee
*Assistant Examiner* — Olanrewaju J. Bucknor
(74) *Attorney, Agent, or Firm* — Shook, Hardy & Bacon L.L.P.

(57) ABSTRACT

Aspects of the present disclosure include a system comprising a machine-readable storage medium storing at least one program and computer-implemented methods for detecting anomalies in revisions to a web document. Consistent with some embodiments, a method includes publishing, at a network-based content publication platform, a web document comprising a plurality of distinct elements generated using data received from a computing device of a user. The method further includes accessing an updated web document that was generated based on modifications to the published web document made by the user. The method further includes generating one or more anomaly scores based on a comparison of the updated web document to the published web document, and determining whether to allow publication of the updated web document based on a result of a comparison of the anomaly score to a threshold anomaly score.

20 Claims, 11 Drawing Sheets

(56) References Cited

U.S. PATENT DOCUMENTS

| | | | |
|---|---|---|---|
| 7,559,016 | B1 | 7/2009 | Rakowski et al. |
| 8,280,865 | B1 | 10/2012 | Edelman et al. |
| 8,381,095 | B1 | 2/2013 | Fischer |
| 8,484,173 | B1 | 7/2013 | Gengelbach |
| 8,886,660 | B2 | 11/2014 | Dombrowski et al. |
| 8,898,153 | B1 | 11/2014 | Kim et al. |
| 9,063,949 | B2 | 6/2015 | Zhai et al. |
| 9,330,191 | B2 | 5/2016 | Teevan et al. |
| 2002/0013825 | A1 | 1/2002 | Freivald et al. |
| 2004/0205454 | A1 | 10/2004 | Gansky et al. |
| 2007/0208719 | A1* | 9/2007 | Tran ................. G06F 17/30864 |
| 2007/0220042 | A1* | 9/2007 | Mueller ............... G06Q 10/087 |
| 2009/0204595 | A1* | 8/2009 | Dombrowski ...... G06F 17/3089 |
| 2009/0228777 | A1* | 9/2009 | Henry ............... G06F 17/30017 |
| | | | 715/230 |
| 2009/0259650 | A1* | 10/2009 | Schuil ................. G06F 17/3069 |
| 2011/0191328 | A1* | 8/2011 | Vernon ................ G11B 27/034 |
| | | | 707/723 |
| 2012/0221479 | A1 | 8/2012 | Schneck et al. |
| 2014/0195518 | A1* | 7/2014 | Kelsey .............. G06F 17/30734 |
| | | | 707/722 |
| 2015/0095185 | A1* | 4/2015 | Katukuri ............ G06Q 30/0631 |
| | | | 705/26.7 |
| 2016/0140447 | A1 | 5/2016 | Cohen et al. |
| 2016/0253598 | A1* | 9/2016 | Yamada ............... G06N 99/005 |
| | | | 706/12 |
| 2016/0321582 | A1* | 11/2016 | Broudou ............ G06Q 10/0635 |
| 2017/0344541 | A1* | 11/2017 | Haeusler ............... G06Q 30/02 |

OTHER PUBLICATIONS

International Written Opinion received for PCT Application No. PCT/US2017/038593, dated Sep. 11, 2017, 10 pages.

\* cited by examiner

FIG. 4B

ANOMALY DETECTION FOR WEB DOCUMENT REVISION

TECHNICAL FIELD

The present disclosure generally relates to machines configured to the technical field of special-purpose machines that facilitate management of digital content including computerized variants of such special-purpose machines and improvements to such variants, and to the technologies by which such special-purpose machines become improved compared to other special-purpose machines that facilitate management of digital content. In particular, the present disclosure addresses systems and methods to detect anomalous revisions to published digital content.

Many online content publication platforms allow users to generate and publish content online in the form of a web document (e.g., a web page), which may be viewed by others users using a web browser or application. Each published web document is normally assigned a uniform resource identifier (URI) at or before the time of publication. Typically, these online content publication platforms allow users to revise content even once it has been published. Though some of the content of the web document may be updated, the URI typically remains unchanged. In some instances, allowing revisions to web documents while maintaining the same URI may be problematic for online content publication platforms.

In an example, the content publication platform is an online marketplace that allows users to create web documents in the form of a product listing to offer their products for sale to other users. A user of the online marketplace may initially create a product listing for a first product that is highly demanded, and the online marketplace may then assign a URI to the product listing. The user may then completely revise the product listing to cover a second product with lower demand and desirability while the URI assigned to the product listing will remain the same, though the URI may still be associated with inventory and historical sales of the first product with a higher demand. In this way, the user can exploit the revision ability of the online marketplace to manipulate search ranks for undesirable products, conceal lower demand, manipulate historical sales numbers, or otherwise manipulate the consumer demand for a product. While this may prove to be beneficial for the individual user, this results in an overall degradation in quality of navigation, accuracy of information, and the overall performance and reputation of the online marketplace.

BRIEF DESCRIPTION OF THE DRAWINGS

Various ones of the appended drawings merely illustrate example embodiments of the present disclosure and cannot be considered as limiting its scope.

FIG. 4B is an interface diagram illustrating updated version of the published web document, according to example embodiments.

DETAILED DESCRIPTION

Figure 1:
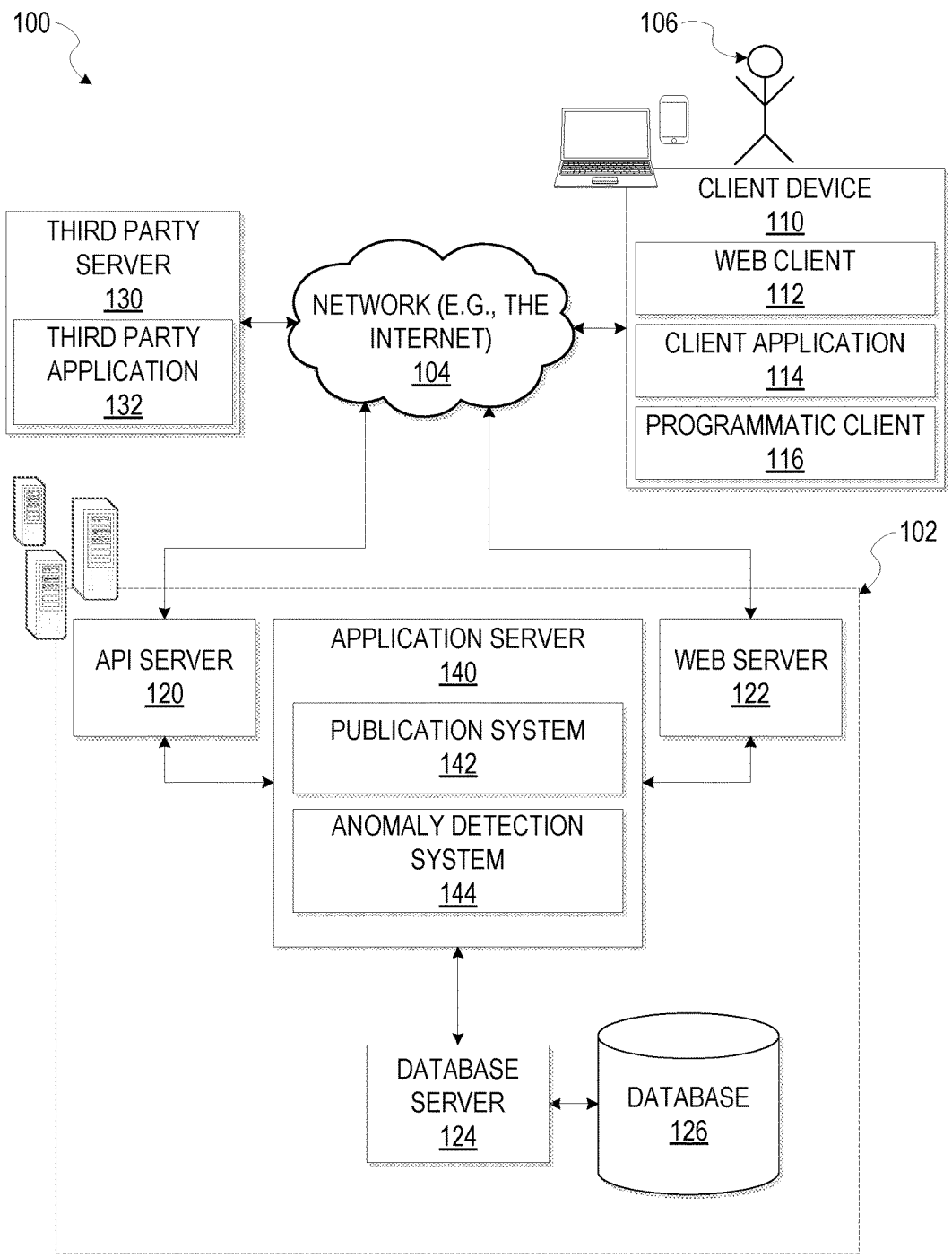
FIG. 1 is a network diagram depicting a content publication platform having a client-server architecture configured for exchanging data over a network, according to example embodiments.

Reference will now be made in detail to specific example embodiments for carrying out the inventive subject matter. Examples of these specific embodiments are illustrated in the accompanying drawings. It will be understood that these examples are not intended to limit the scope of the claims to the illustrated embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details.

Aspects of the present disclosure involve a system and methods for detecting anomalies in revisions to a web document. As used herein, an "anomaly" includes modifications to a web document that alter the web document beyond an expected threshold of change. In example embodiments, the web document is a web page such as an online marketplace listing for a product. The inventive subject matter of the present disclosure is applicable to any online content publication platform that allows users to revise published content. In one example, the online content publication platform is an online marketplace.

Example embodiments involve web documents that include multiple distinct elements such as images, text, and numerical values. In the example web document of a listing, the distinct elements may include an image of a product, a textual description of a product, and a price. In these example embodiments, a method may include accessing an updated version (e.g., a user revised version) of a published web document. The method further includes comparing the individual parts of the published (e.g., unchanged) web document with corresponding parts of the updated document to generate various anomaly scores. For example, a published image included in the published web document may be compared to an updated image included in the updated web document to generate an image similarity score; published text included in the published web document may be compared to an updated text included in the updated web document to generate an text match score; and an updated numerical value included in the updated web document may be compared to a published numerical value (or an average of previously published associated numerical values) to generate a numerical deviation score.

The method may further include determining whether to publish the updated web document based on a comparison of the anomaly scores to threshold anomaly scores. In some embodiments, the system may prevent the publication of the updated web document if any one of the anomaly scores is above a threshold score. In other embodiments, the system may prevent the publication of the updated web document if a combination of the anomaly scores is above a threshold score. Additional aspects of the present disclosure include using machine-learning techniques to revise the threshold scores based on manual inspection of revised listings in which anomalies were detected.

With reference to FIG. 1, an example embodiment of a high-level client-server-based architecture 100 is shown. While FIG. 1 depicts the client-server-based architecture 100, the present inventive subject matter is, of course, not limited to such an architecture, and could equally well find application in an event-driven, distributed, or peer-to-peer architecture system, for example. Further, to avoid obscuring the inventive subject matter with unnecessary detail, various functional components that are not germane to conveying an understanding of the inventive subject matter have been omitted from FIG. 1. Moreover, it shall be appreciated that although the various functional components illustrated in FIG. 1 are discussed in a singular sense, multiple instances of any one of the various functional components may be employed.

A content publication platform 102, in the example form of a network-based marketplace, provides server-side functionality via a network 104 (e.g., the Internet or wide area network (WAN)) to one or more client devices 110. FIG. 1 illustrates, for example, a web client 112 (e.g., a browser), a client application 114, and a programmatic client 116 executing on client device 110. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the content publication platform 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. In one embodiment, the content publication platform 102 is a network-based marketplace that publishes publications (e.g., web documents) comprising item listings of products available on the network-based marketplace.

One or more users 106 may be a person, a machine, or other means of interacting with client device 110. In example embodiments, the user 106 is not part of the client-server-based architecture 100, but may interact with the client-server-based architecture 100 via the client device 110 or another means. For example, the user 106 may provide input (e.g., touch screen input or alphanumeric input) to the client device 110, and the input is communicated to the content publication platform 102 via the network 104. In this instance, the content publication platform 102, in response to receiving the input from the user 106, communicates information to the client device 110 via the network 104 to be presented to the user 106. In this way, the user 106 can interact with the content publication platform 102 using the client device 110.

The client device 110 may include one or more client applications 114 (also referred to as "apps") such as, but not limited to, a web browser, messaging application, electronic mail (email) application, an e-commerce site application (also referred to as a marketplace application), and the like. In some embodiments, if the e-commerce site application is included in the client device 110, then this application is configured to locally provide the user interface and at least some of the functionalities with the client application 114 configured to communicate with the content publication platform 102, on an as needed basis, for data or processing capabilities not locally available (e.g., access to a database of items available for sale, to authenticate the user 106, to verify a method of payment, etc.). Conversely if the e-commerce site application is not included in the client device 110, the client device 110 may use its web browser to access the e-commerce site (or a variant thereof) hosted on the content publication platform 102.

An application program interface (API) server 120 and a web server 122 are coupled to, and provide programmatic and web interfaces respectively to an application server 140. The application server 140 may host a publication system 142 and an anomaly detection system 144, each of which may comprise one or more modules or applications 114 and each of which may be embodied as hardware, software, firmware, or any combination thereof. The application server 140 is, in turn, shown to be coupled to a database server 124 that facilitate access to database 126. In an example embodiment, the database 126 is a storage devices that stores information to be posted (e.g., publications or listings) to the publication system 142. The databases 126 may also store digital item information in accordance with example embodiments.

Additionally, a third party application 132, executing on a third party server 130, is shown as having programmatic access to the content publication platform 102 via the programmatic interface provided by the API server 120. For example, the third party application 132, utilizing information retrieved from the content publication platform 102, supports one or more features or functions on a website hosted by the third party.

The publication system 142 provides a number of publication functions and services to users 106 that access the content publication platform 102. For example, the publication system 142 provides interfaces (e.g., through communication with the client device 110) that allow the user 106 to create and publish web documents using the client device 110. The publication system 142 may further provide interfaces that allow the user 106 to modify various parts of the published web document.

The anomaly detection system 144 is configured to monitor changes made by the user 106 to published web documents in order to detect anomalous updates. To this end, the anomaly detection system 144 compares updated web documents to previous or original versions of the web documents to generate various anomaly scores based on the degree to which the web document is modified. The anomaly detection system 144 may flag certain updated web documents based on these anomaly scores to prevent the publication system 142 from publishing the updated web document.

While the publication system 142 and anomaly detection system 144 are shown in FIG. 1 to both form part of the content publication platform 102 (e.g., the publication system 142 and anomaly detection system 144 are sub-systems of the content publication platform 102), it will be appreciated that, in alternative embodiments, each system 142 and 144 may form part of a service or platform that is separate and distinct from the content publication platform 102. In some embodiments, the anomaly detection system 144 may form part of the publication system 142.

Figure 2:
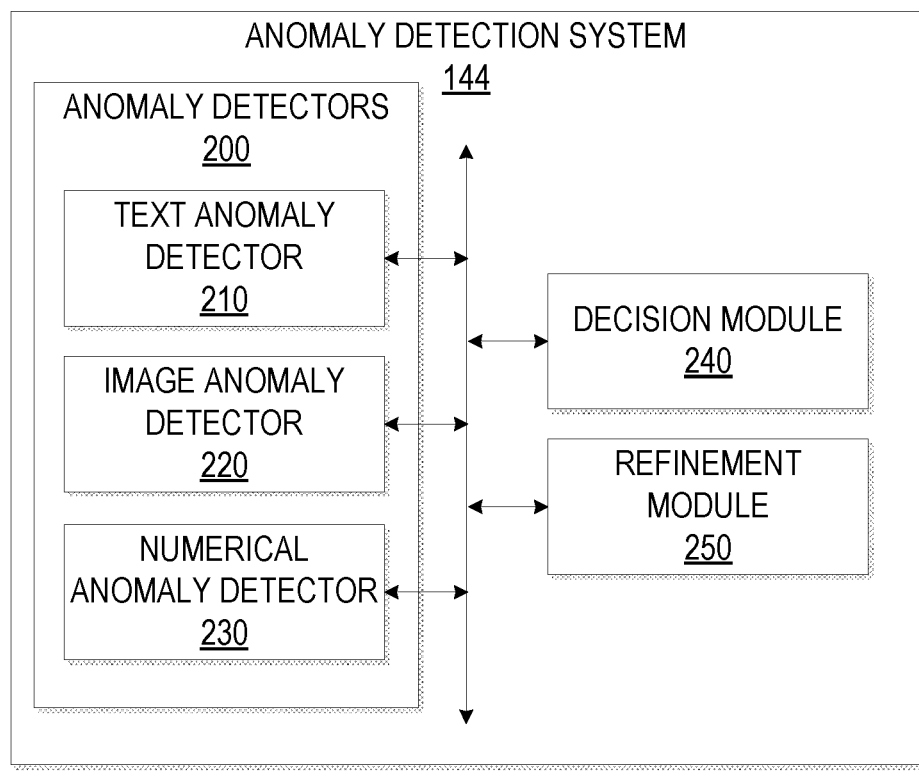
FIG. 2 is a block diagram depicting various functional components of an anomaly detection system, which is provided as part of the content publication platform, according to example embodiments.

FIG. 2 is a block diagram depicting various functional components of the anomaly detection system 144, according to example embodiments. To avoid obscuring the inventive subject matter with unnecessary detail, various functional components (e.g., modules, engines, and databases) that are not germane to conveying an understanding of the inventive subject matter have been omitted from FIG. 2. However, a skilled artisan will readily recognize that various additional functional components may be supported by the anomaly detection system 144 to facilitate additional functionality that is not specifically described herein.

As shown, the anomaly detection system 144 includes anomaly detectors 200, a decision module 240, and a refinement module 250. The anomaly detectors 200 include a text anomaly detector 210, an image anomaly detector 220, and a numerical anomaly detector 230. Each of the above referenced functional components of the anomaly detection system 144 are configured to communicate with each other (e.g., via a bus, shared memory, a switch, or application programming interfaces (APIs)). Any one or more of functional components illustrated in FIG. 2 and described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, any of the functional components illustrated in FIG. 2 may be implemented together or separately within a single machine, database, or device or may be distributed across multiple machines, databases, or devices.

The text anomaly detector 210 is responsible for detecting anomalies in revised web documents occurring as a result of modifications to text included in one or more prior published versions of the web documents. To this end, the text anomaly detector 210 is configured to compare modified text included in a modified web document to published text included in a published web document. Using the comparison as a basis, the text anomaly detector 210 generates a text match score that provides a measure of similarity between the modified text and the published text. In determining whether the modified text represents an anomaly, the text anomaly detector 210 compares the text match score to a threshold text match score. If the text match score transgresses the threshold text match score, the text anomaly detector 210 determines that an anomaly exists with respect to the modified text.

The image anomaly detector 220 is responsible for detecting anomalies in revised web documents occurring as a result of modifications to images included in one or more prior published versions of the web documents. To this end, the image anomaly detector 220 is configured to compare a modified image included in a modified web document to a published image included in a published web document. Using the comparison as a basis, the image anomaly detector 220 generates an image similarity score that provides a measure of similarity between the modified image and the published image. In determining whether the modified image represents an anomaly, the image anomaly detector 220 compares the image similarity score to a threshold image similarity score. If the image similarity score transgresses the threshold image similarity score, the image similarity detector 220 determines that an anomaly exists with respect to the modified image.

In some embodiments, the image anomaly detector 220 extracts keypoints from an original image, which are then stored in the database 126. The updated image is compared with the original published image by individually comparing each feature from the new image to the stored features of the original image in the database 126 and finding candidate matching features based on Euclidean distance of their feature vectors. From the full set of matches, subsets of keypoints that agree on the object and its location, scale, and orientation in the new image are identified by the image anomaly detector 220 to filter out good matches.

The numerical anomaly detector 230 is responsible for detecting anomalies in revised web documents occurring as a result of modifications to numerical values included in one or more prior published versions of the web documents. To this end, the numerical anomaly detector 230 is configured to compare a modified numerical value included in a modified web document to one or more numerical values included in one or more published web documents. In some embodiments, the numerical anomaly detector 230 compares the modified numerical value to a published numerical value included in the published version of the same web document. In other embodiments, the numerical anomaly detector 230 compares modified numerical value to an average of multiple numerical values included in associated published web documents. For example, the web document may include a price for a product, and the numerical anomaly detector 230 may compare a modified price for the product to an average price for the product calculated from multiple listings for the product.

Using the comparison as a basis (e.g., to a single prior published numerical value or to an average of published numerical values), the numerical anomaly detector 230 generates a numerical deviation score that indicates a deviation of the modified numerical value from the one or more published numerical values. In determining whether the modified numerical value represents an anomaly, the numerical anomaly detector 230 compares the numerical deviation score to a threshold numerical deviation score. If the numerical deviation score transgresses the threshold numerical deviation score, the numerical anomaly detector 230 determines that an anomaly exists with respect to the modified numerical value.

Each of the text match score, image similarity score, and numerical deviation scores may be considered anomaly scores. The text anomaly detector 210, the image anomaly detector 220, and the numerical anomaly detector 230 provide the anomaly scores to the decision module 240 along with indications (e.g., flags) of whether an anomaly exists in respective portions (e.g., text, image, or numerical value) of the modified web document. The decision module 240 uses the information provided by the text anomaly detector 210, the image anomaly detector 220, and the numerical anomaly detector 230 to determine whether to allow publication of the modified web document. In some embodiments, the decision module 240 may prevent publication of the modified web document if an anomaly exists in any one portion (e.g., text, image, or numerical value) of the modified web document.

In some embodiments, the decision module 240 aggregates respective anomaly scores (e.g., text match score, image similarity score, and numerical deviation score) to generate an aggregate anomaly score. For example, the decision module 240 may sum each respective anomaly score to generate the aggregate anomaly score. The decision module 240 may further compare the aggregate anomaly score to a threshold aggregate anomaly score to determine whether to allow publication of the updated web document. If the aggregate anomaly score transgresses the threshold anomaly score, the decision module 204 prevents publication of the modified web document.

The refinement module 250 is configured to refine various threshold scores (e.g., threshold text match score, threshold image similarity score, threshold numerical deviation score and threshold aggregate anomaly score) based on results of manual inspection of modified web documents determine to be anomalous. For example, upon deciding to prevent publication of a modified web document, the decision module 240 may flag the modified web document for manual inspection by an administrative user. If, in manually inspecting the modified web document, the administrative user determines that an anomaly does not exist, the refinement module 250 may revise one or more of the threshold anomaly scores such as by increasing the threshold.

Figure 3:
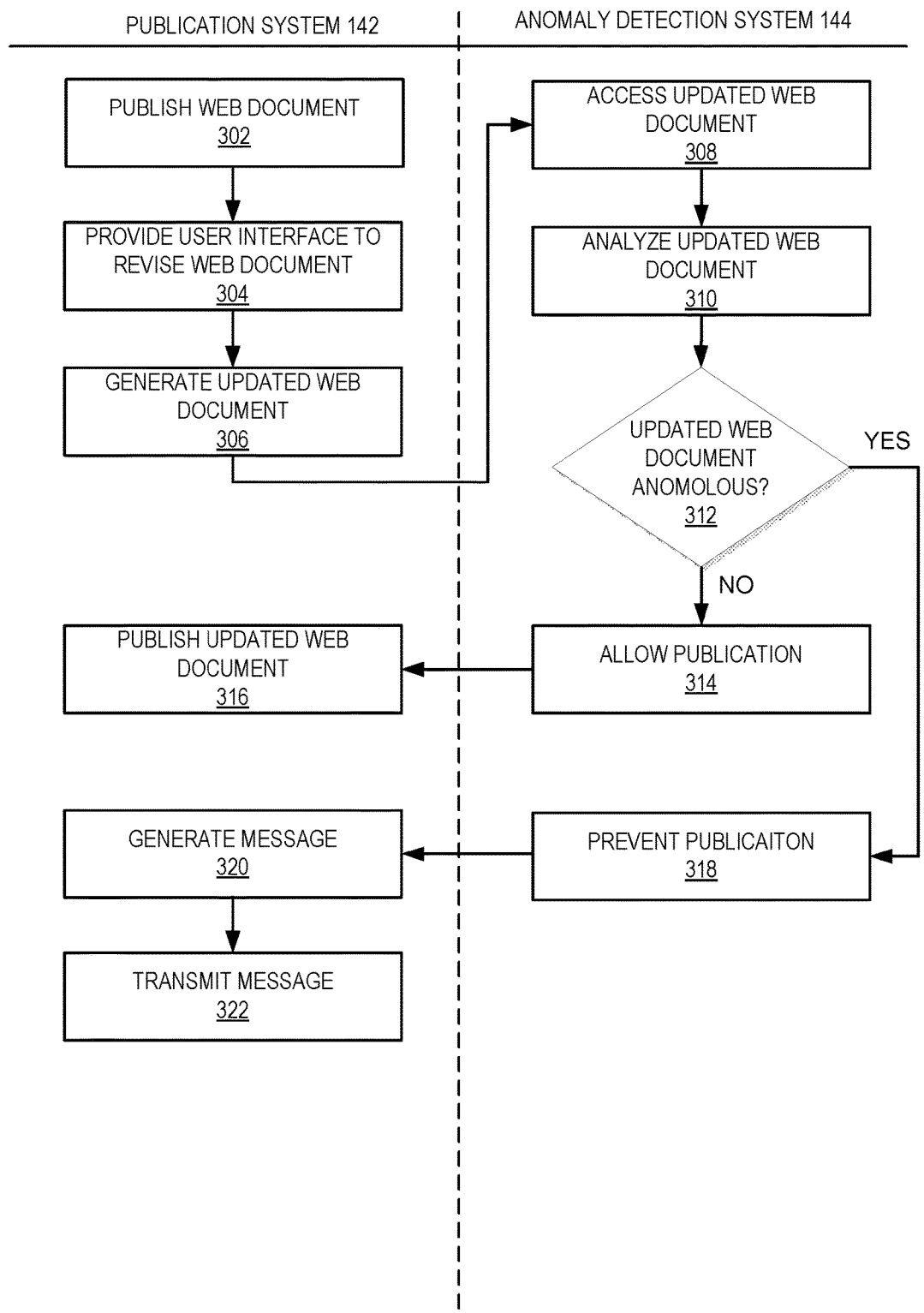
FIG. 3 is an interaction diagram depicting example exchanges between a publication system and the content publication platform, according to example embodiments.

FIG. 3 is an interaction diagram depicting example exchanges between the publication system 142 and the anomaly detection system 144, according to example embodiments. At operation 302, the publication system 142 publishes a web document generated using data received from the client device 110 based on information supplied by the user 106. Upon being generated, the web document is assigned a URI that uniquely identifies the web document. The web document may be accessed by and displayed on the client device 110 or other such device using the web client 112, client application 114, or the programmatic client 116. For example, the client device 110 submits a request to the application server 140 for a particular document, and the application server 140 responds to the client device 110 with the web document and any other data needed for the client device 110 to display the web document.

Figure 4A:
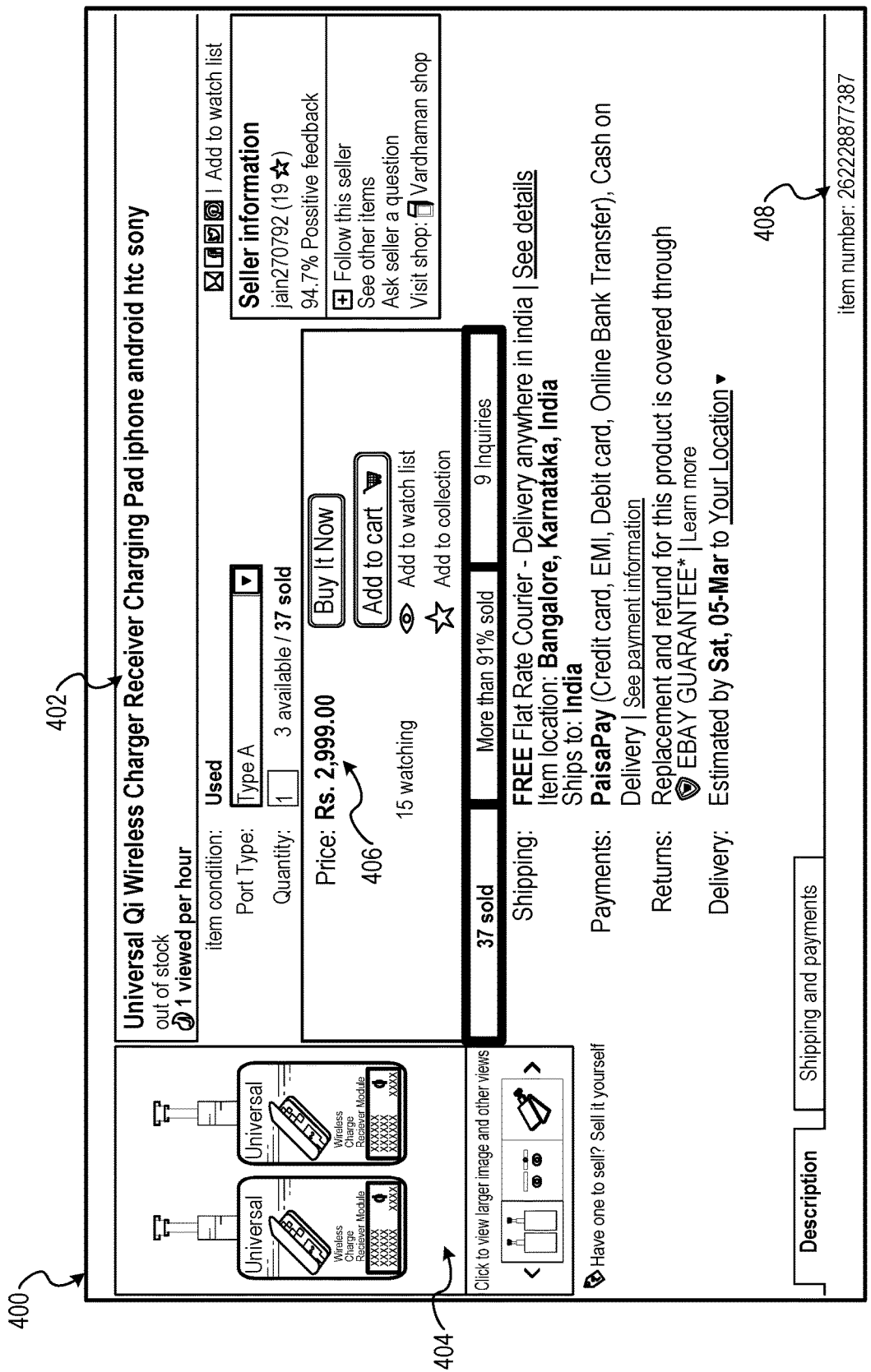
FIG. 4A is an interface diagram illustrating a published web document, according to example embodiments.

As example, FIG. 4A illustrates a published web document 400 in the exemplary form of a marketplace product listing. As shown, the web document 400 comprises multiple distinct elements including: text 402—a title of a product; image 404—an image of the product; and numerical value 406—a price of the product. The web document 400 further includes URI 408 that uniquely identifies the web document 400.

Returning to FIG. 3, the publication system 142 provides, to the client device 110, a user interface for revising the published web document (e.g., published web document 400) in operation 304. The user interface includes multiple fields that correspond to the multiple distinct elements of the published web document (e.g., text 402, images 404, and numerical values 406) that allow the user 106 to modify each portion of the web document.

Figure 4B:
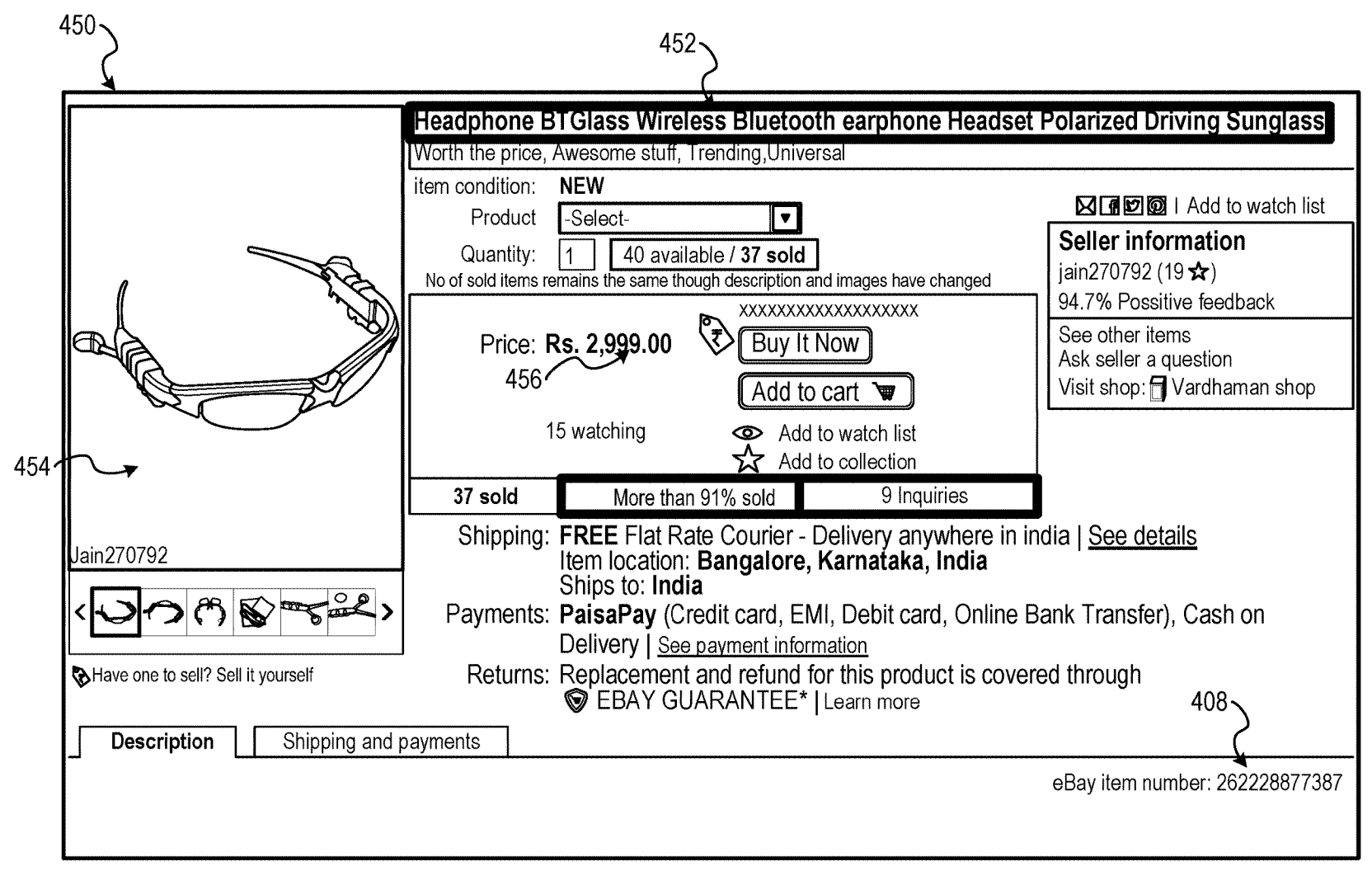

At operation 306, the publication system 142 generates an updated web document based on modifications to the published web document. As an example, FIG. 4B illustrates an updated web document 450 generated based on modifications to the web document 400. As shown, the updated web document 450 includes the URI 408, which is the same as in the web document 400, although the text 402 has been changed to text 452, the image 404 has been changed to image 454, and the numerical value 406 has been changed to numerical value 456.

At operation 308, the anomaly detection system 144 accesses the updated web document generated by the publication system 142 (e.g., updated web document 450). At operation 310, the anomaly detection system 144 analyzes the updated web document. In analyzing the updated web document, the anomaly detection system 144 compares the various updated portions of the updated web document to the various portions of the published web document (published at operation 302) to generates anomaly scores to use as basis in determining whether the updated web document is anomalous.

At operation 312, the anomaly detection system 144 determines whether the updated web document is anomalous. In other words, the anomaly detection system 144 determines whether the updated web document includes an anomaly as a result of one or more modifications made by the user 106 using the user interface provided at operation 304. The determining of whether the updated web document is anomalous is based on the anomaly detection system 144 determining whether one or more anomaly scores (e.g., text match score, image similarity score, numerical deviation score, and aggregate anomaly score) transgresses (e.g., is greater than) a corresponding threshold anomaly score.

If, at operation 312, the anomaly detection system 144 determines that the updated web document is not anomalous, the anomaly detection system 144 allows publication of the updated web document at operation 314, and the publication system 142 publishes the updated web document at operation 316.

If, at operation 312, the anomaly detection system 144 determines that the updated web document is anomalous, the anomaly detection system 144 prevents publication of the updated web document at operation 318. For example, the anomaly detection system 144 may instantiate a flag that, when read by the publication system 142, causes the publication system 142 to end the publication process with respect to the updated web document.

In response to the anomaly detection system 144 preventing publication of the updated web document, the publication system 142 generates a message at operation 320 to inform the user 106 that the modifications to the web document will not be allowed and the updated web document will not be published due to the anomaly being detected. At operation 322, the publication system 142 transmits the message to the client device 110 of the user 106. The publication system 142 may utilize any one of a number of message delivery networks and platforms to deliver the message to the client device 110 of the user 106. For example, the publication system 142 may deliver push notifications (e.g., via a pertinent push notification service), electronic mail (e-mail), instant message (IM), short message service (SMS), text, facsimile, or voice (e.g., voice over IP (VoIP)) messages via the wired (e.g., the Internet), plain old telephone service (POTS), or wireless (e.g., mobile, cellular, WiFi, WiMAX) networks.

Figure 5:
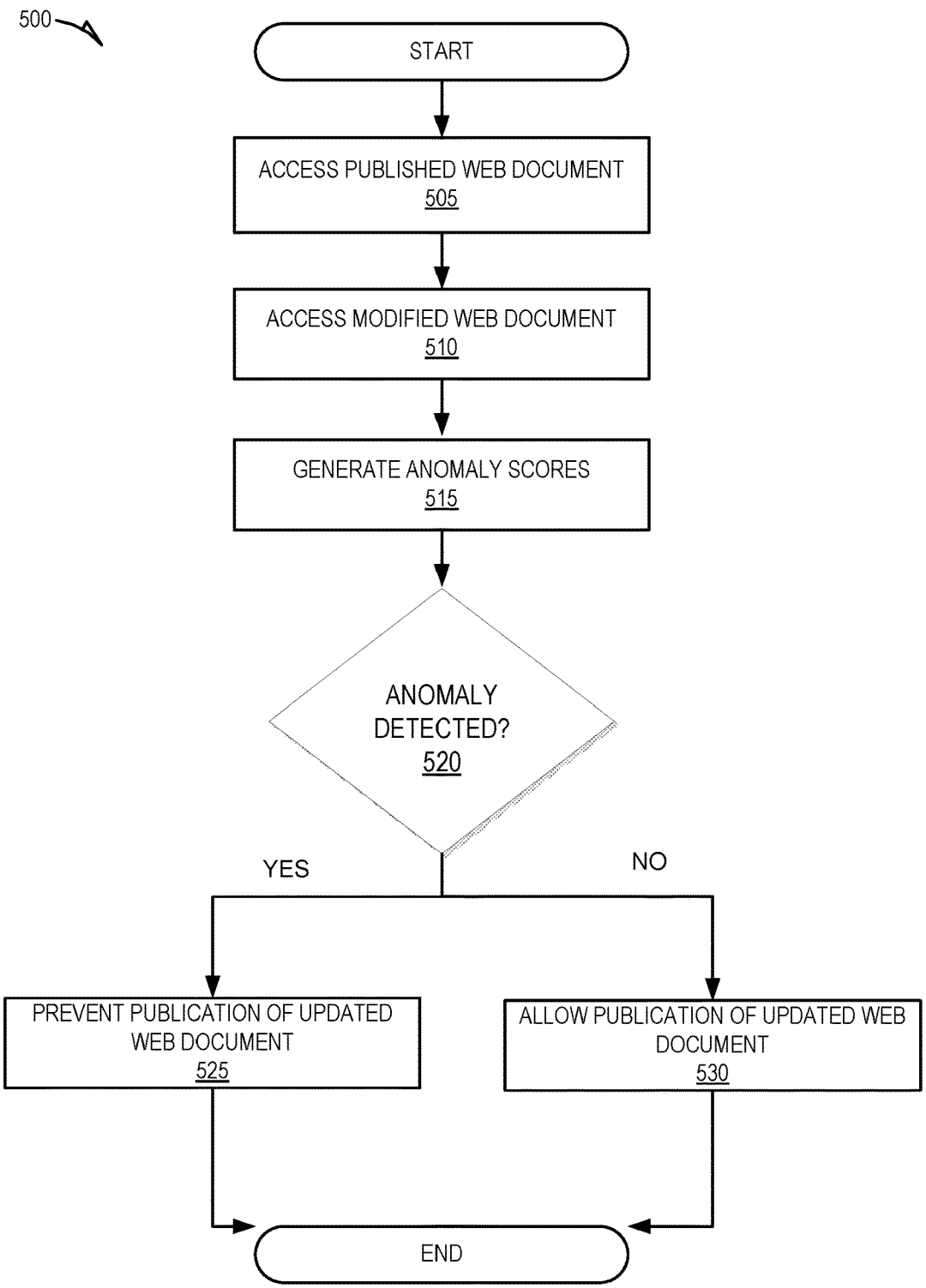
FIGS. 5-8 is are flow charts illustrating example operations of the anomaly detection system in providing an anomaly detection service for the content publication platform, according to example embodiments.

FIG. 5 is a flow chart illustrating example operations of the anomaly detection system 144 in performing a method 500 for providing an anomaly detection service for the content publication platform 102, according to example embodiments. The method 500 may be embodied in computer-readable instructions for execution by one or more processors such that the operations of the method 500 may be performed in part or in whole by the anomaly detection system 144; accordingly, the method 500 is described below by way of example with reference thereto. However, it shall be appreciated that at least some of the operations of the method 500 may be deployed on various other hardware configurations and the method 500 is not intended to be limited to the anomaly detection system 144.

At operation 505, the anomaly detection system 144 accessing a published web document (e.g., published web document 400). The published web document includes multiple distinct elements such as text, one or more images, and one or more numerical values. The distinct elements may be generated by or based on information from the user 106 of the content publication platform 102. In an example, the published web document corresponds to a marketplace product listing and includes a textual description of the product, one or more images of the product, and a price for the product.

At operation 510, the anomaly detection system 144 accesses an updated (modified) web document (e.g., updated web document 450). The updated web document is based on one or more modifications (e.g., initiated by the user 106) to the published web document. As with the published web document, the updated web document includes multiple distinct elements (e.g., text, one or more images, and one or more numerical values). The updated web document includes at least one user revision (e.g., modification) to a distinct element of the published web document, and in some instances may include at least one user revision to each part of the published web document.

The updated web document may be or include a data object stored in the database 126, and may be generated based on user input (e.g., user revisions) received from a user interface that allows the user 106 to edit published web documents. Further, both the published web document and the updated web document are assigned with the same URI 408.

At operation 515, the anomaly detectors 200 generate one or more anomaly scores. Each of the one or more anomaly scores provide a measure of deviation of the updated web document from the published web document. The one or more anomaly scores may include one or more of a text match score, an image similarity score, and a numerical deviation score. Accordingly, the generating of the one or more anomaly scores may include: computing a text match score based on a comparison of updated text (e.g., updated text 452) included in the updated web document with published text (e.g., published text 402) included in the published web document; computing an image similarity score based on a comparison of a updated image (e.g., updated image 454) included in the updated web document with a published image (e.g., published image 404) included in the published web page; and computing a numerical deviation score based on a difference between an updated numerical value (e.g., updated numerical value 456) included in the updated web document and an average of numerical values (e.g. average prices of a product) associated with the web document.

In some embodiments, the one or more anomaly scores include an aggregate anomaly score. Accordingly, in these embodiments, the generating of the one or more anomaly scores may additionally include aggregating the text match score, image similarity score, and numerical deviation score to generate the aggregate anomaly score.

At operation 520, the anomaly detection system 144 detects whether the updated web document includes an anomaly. The detecting of the anomaly in the updated web document includes comparing the one or more anomaly scores to one or more corresponding threshold anomaly scores. In some embodiments, the detecting of an anomaly includes any one of: determining the text match score transgresses a threshold text match score; determining the image similarity score transgresses a threshold image similarity score; or determining the numerical deviation score transgresses a threshold numerical deviation score. In embodiments in which the one or more anomaly scores include an aggregate anomaly score, the detecting of the anomaly in the updated web document may include determining the aggregate anomaly score transgresses a threshold anomaly score.

If, at operation 520, the anomaly detection system 144 detects an anomaly in the updated web document, the anomaly detection system 144 prevents publication of the updated web document at operation 525. For example, the anomaly detection system 144 may instantiate a flag associated with the updated web document that stops the publication system 142 from publishing the updated web document.

If, at operation 520, the anomaly detection system 144 does not detect an anomaly in the updated web document, the anomaly detection system 144 allows publication of the updated web document in operation 530. Following the example from above, the anomaly detection system 144 does not instantiate the flag associated with an anomaly, and in turn, the publication system 142 proceeds to publish the updated web document. In another example, the anomaly detection system 144 may instantiate a different flag that signals the publication system 142 to proceed with publishing the updated web document.

Figure 6:
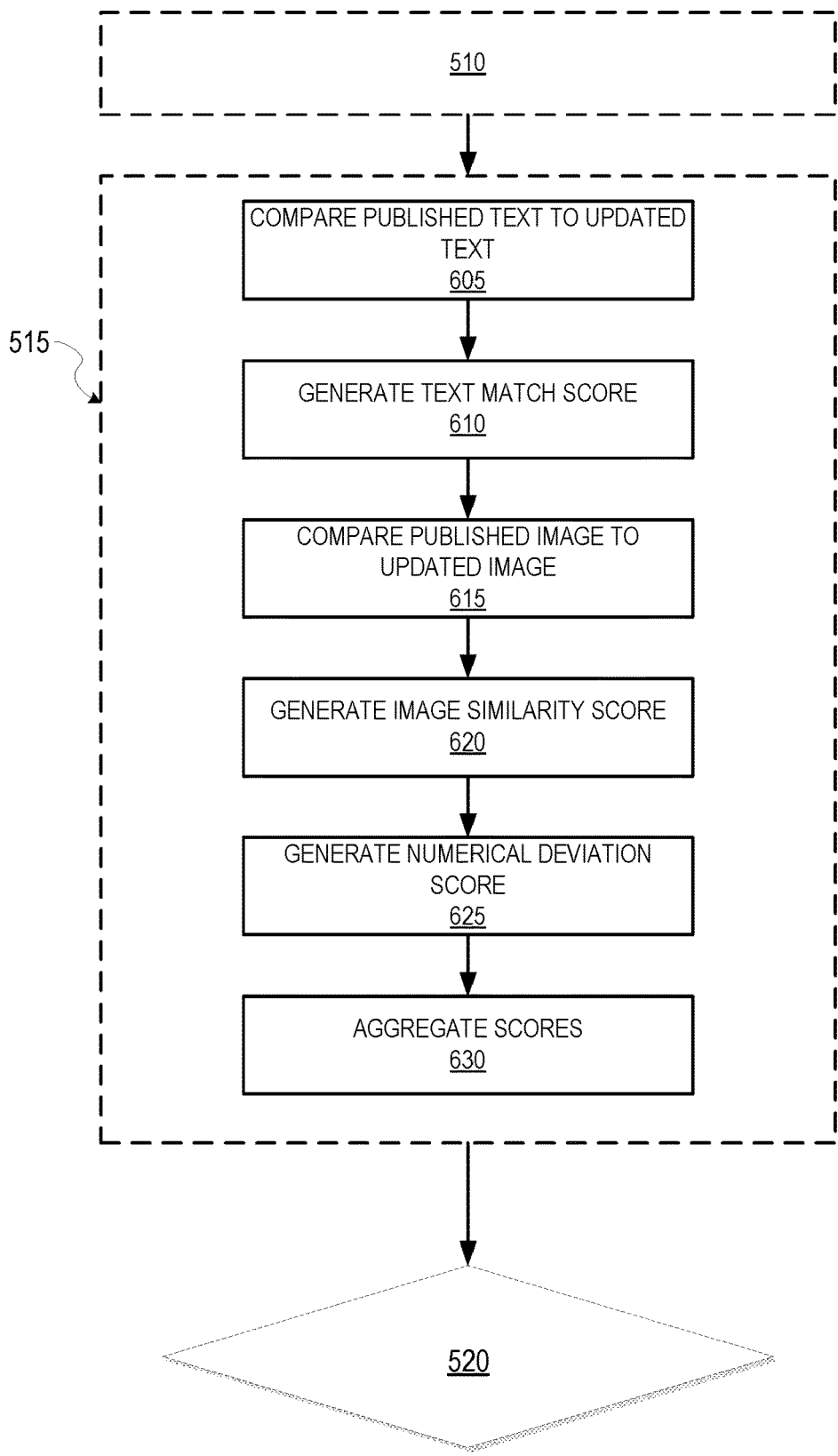

As shown in FIG. 6, the method 500 may include operations 605, 610, 615, 620, 625, and 630. In some example embodiments, operations 605, 610, 615, 620, 625, and 630 included in the method 500 may be performed prior to or as part (e.g., a precursor task, a subroutine, or a portion) of operation 515 of method 500, in which the anomaly detection system 144 generates one or more anomaly scores.

At operation 605, the text anomaly detector 210 compares published text (e.g., published text 402) included in the published web document (e.g., published web document 400) with updated text (e.g., updated text 452) included in the updated web document (e.g., updated web document 450). At operation 610, the text anomaly detector 210 generates a text match score based on the comparison of the published text with the modified text. The text match score provides a measure of similarity between the published text and the modified text.

The text match score may, for example, be or include a cosine similarity score, which provides a measure of similarity between two vectors of an inner product space that measures the cosine angle between them. Accordingly, in some embodiments, the generating of the text match score may include applying a cosine similarity algorithm to two vectors—a first vector corresponding to the published text and a second vector corresponding to the updated text.

In a first example, the published text may include "Headset work Mobile phones Driving Sunglass Headphone BTGlass Wireless Bluetooth" and the modified text may include "Headset work Mobile phones Driving Sunglass Headphone BTGlass Wireless Bluetooth—with extra protection." In this example, the published text has been modified to include additional attributes, namely "with extra protection." Application of the cosine similarity algorithm in this example returns a cosine similarity score of 87.71.

In a second example, the published text may include "Headset work Mobile phones Driving Sunglass Headphone BTGlass Wireless Bluetooth" and the modified text may include "Headset Driving Sunglass Wireless Bluetooth Headphone BTGlass work Mobile phones." In this example, the published text has been modified by rearranging the order of some words. Application of the cosine similarity algorithm in this example returns a cosine similarity score of 99.99.

In a third example, the published text may include "Headset work Mobile phones Driving Sunglass Headphone BTGlass Wireless Bluetooth" and the modified text may include "Universal Qi Wireless Charger Receiver Charging Pad iphone android htc sony." In this example, the published text has been completely changed. Application of the cosine similarity algorithm in this example returns a cosine similarity score of 9.53.

At operation 615, the image anomaly detector 220 compares a published image (e.g., published image 404) included in the published web document with an updated image (e.g., updated image 454) included in the updated web document. At operation 620, the image anomaly detector 220 generates an image similarity score based on the comparison of the published image to the updated image. The image similarity score provides a measure of similarity between the published image and the updated image. Further details regarding operation 620, according to some example embodiments, are discussed below in reference to FIG. 7.

At operation 625, the numerical anomaly detector 230 generates a numerical deviation score based on an analysis of an updated (e.g., modified) numerical value (e.g., updated numerical value 456) included in the updated web document. In some embodiments, the numerical anomaly detector 230 generates the numerical deviation score by calculating the difference between the published numerical value and the updated numerical value.

In other embodiments, the numerical anomaly detector 230 generates the numerical deviation score based on a comparison of the updated numerical value to an average of numerical values associated with the published web document. For example, the published web document may include a marketplace listing offering the product for sale, and the published numerical value may be a price for the product. In this example, the numerical anomaly detector 230 may determine an average price for the product based, for example, on other listings for the product published by the content publication platform 102. The numerical anomaly detector 230 calculates the difference between an updated price for the product to the calculated average price for the product.

At operation 630, which is optional in some embodiments, the decision module 240 aggregates the text match score, the image similarity score, and the numerical deviation score to generate an aggregate anomaly score. For example, the decision module 240 may sum (either weighted or unweighted) the text match score, the image similarity score, and the numerical deviation score to generate the aggregate anomaly score.

Figure 7:
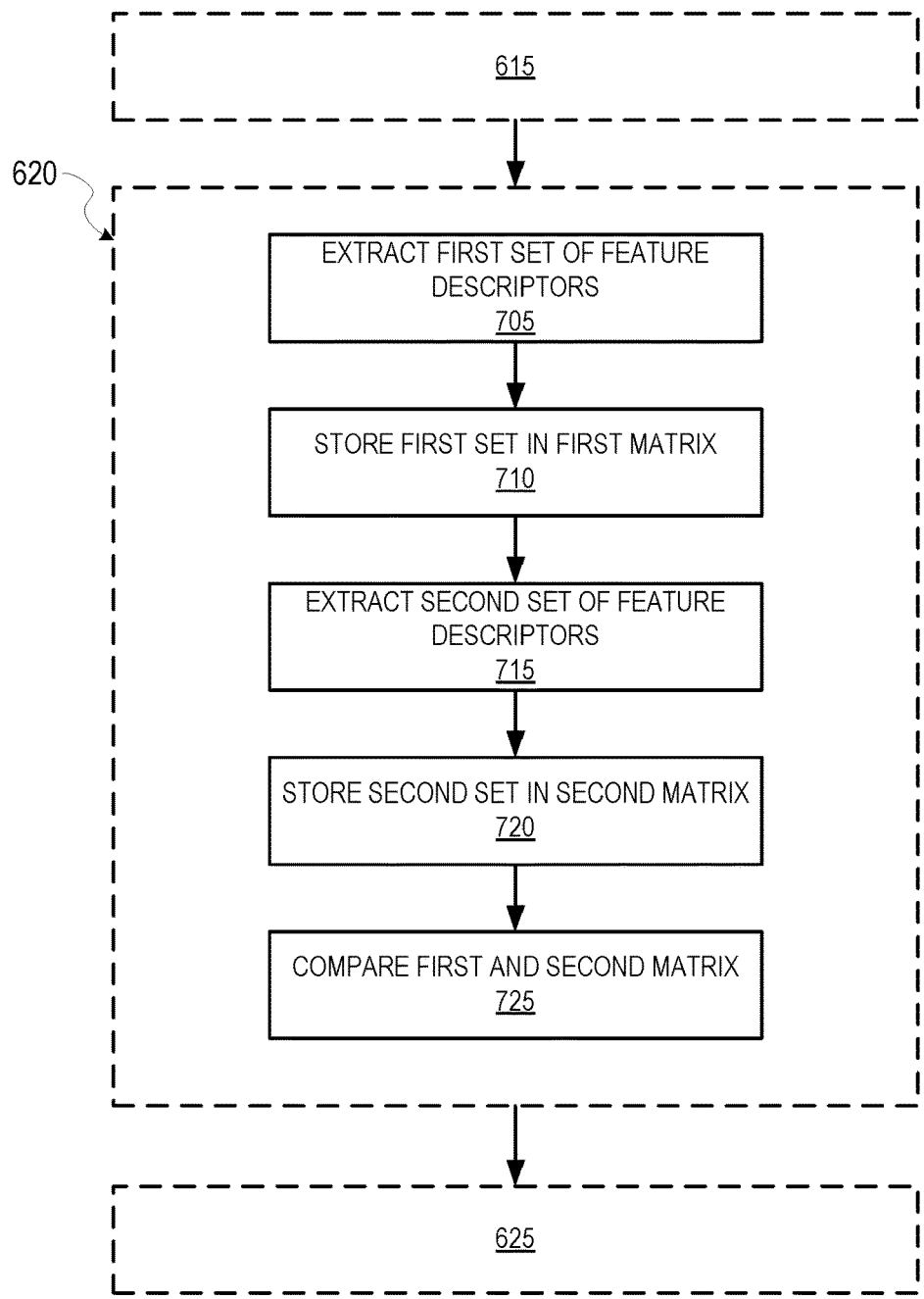

As shown in FIG. 7, the method 500 may include the additional operations 705, 710, 715, 720, and 725. In some example embodiments, operations 705, 710, 715, 720, and 725 included in the method 500 may be performed prior to or as part (e.g., a precursor task, a subroutine, or a portion) of operation 620 of operation 515 of method 500, in which the image anomaly detector 220 generates the image similarity score.

At operation 705, the image anomaly detector 220 extracts a first set of feature descriptors from the published image (e.g., published image 404). The first set of feature descriptors comprise interesting key points from the published image that provide a "feature description" of the published image. To perform reliable recognition, it is important that the features extracted from the original image be detectable even under changes in image scale, noise, and illumination. Such points usually lie on high-contrast regions of the image, such as object edges, for example. Similarly, features located in articulated or flexible objects may be unsuitable if any change in their internal geometry happens between two images in the set being processed. Accordingly, the image anomaly detector 220 may extract a large number of features from the images to reduce the contribution of the errors caused by these local variations in the average error of all feature matching errors.

In some embodiments, the image anomaly detector 220 may make use of a scale-invariant feature transform (SIFT) algorithm to extract image feature descriptors. Using SIFT, the image anomaly detector 220 transforms the published image into a large collection of feature vectors, each of which is invariant to image translation, scaling, and rotation, partially invariant to illumination changes, and robust to local geometric distortion. Key locations for extraction may include maxima and minima of the result of difference of Gaussian functions applied in scale space to a series of smoothed and resampled images. The image anomaly detector 220 may discard low contrast candidate points and edge response points along an edge. The image anomaly detector 220 assigns dominant orientations to localized keypoints. The image anomaly detector 220 may then obtain image feature descriptors by considering pixels around a radius of the key location, blurring and resampling of local image orientation planes.

At operation 710, the image anomaly detector 220 stores the first set of feature descriptors in a first matrix that corresponds to the published image. A matrix is an array data structure comprising a collection of elements, each of which is identified by at least one index or key.

At operation 715, the image anomaly detector 220 extracts a second set of image feature descriptors from the updated image (e.g., updated image 454). Similar to the first set of image feature descriptors, the second set of image descriptors comprise interesting key points from the updated image that provide a "feature description" of the updated image. The image anomaly detector 220 extracts the second set of image feature descriptors from the updated image in a similar manner to that discussed above with reference to the extraction of the first set of image descriptors from the published image. At operation 720, the image anomaly detector 220 stores the second set of feature descriptors in a second matrix that corresponds to the updated image.

At operation 725, the image anomaly detector 220 compares the first matrix to the second matrix to ascertain the similarity between the published image and the updated image. If both images show the same object, then the first and second matrices will have similarity, otherwise the matrices will not be similar. Further, if A corresponds to the first matrix and B corresponds to the second matrix, $A \cdot B^{-1}$ should be equal to the identity matrix.

Consistent with some embodiments, the operation of comparing the first matrix to the second matrix may include image feature descriptor matching between the first and second matrices. The best candidate match for each feature descriptor in the second matrix is found by identifying its nearest neighbor in the first matrix. The nearest neighbors are defined as the feature descriptors with minimum Euclidean distance from the given descriptor vector. The image anomaly detector 220 may, for example, utilize the Bestbin-first algorithm, which is a variation of the k-d tree algorithm, to identify the nearest neighbors.

The image anomaly detector 220 generates the image match score based on the comparison of the first matrix to the second matrix. In an example, the image match score generated by the image anomaly detector 220 is equal to the number of image features descriptors matched between the two matrices divided by the total number of image feature descriptors.

Figure 8:
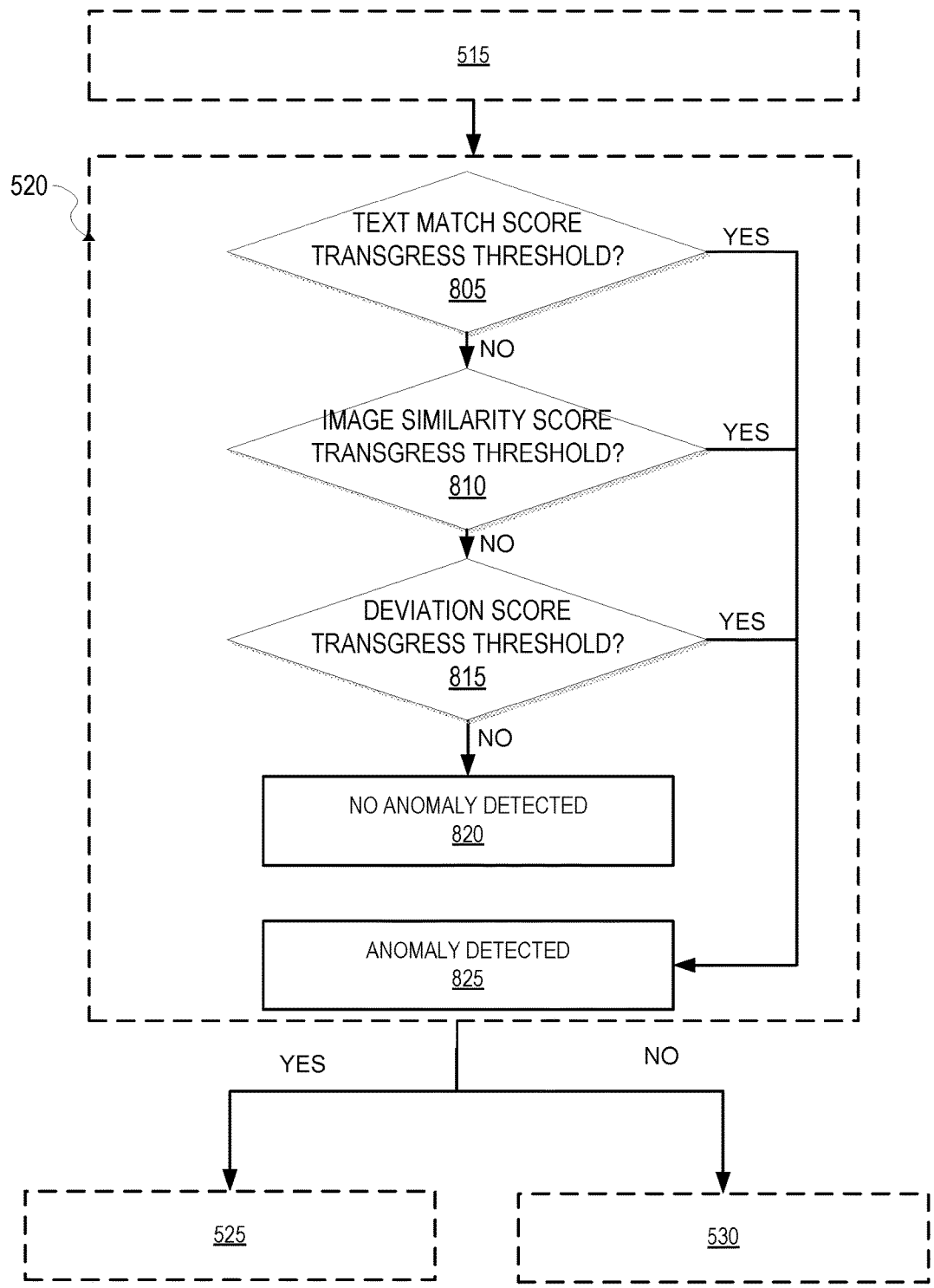

As shown in FIG. 8, the method 500 may include the additional operations 805, 810, 815, 820, and 825. In some example embodiments, operations 805, 810, 815, 820, and 825 included in the method 500 may be performed prior to or as part (e.g., a precursor task, a subroutine, or a portion) of operation 520 of method 500, in which the anomaly detection system 144 determines whether an anomaly is detected in the updated web document.

At operation 805, the text anomaly detector 210 compares the text match score to a threshold text match score to determine whether the text match score transgresses the threshold text match score. The threshold text match score may be a default value set by an administrator of the content publication platform 102 or may be a value refined by the refinement module 250 using machine learning techniques. The threshold text match score amount may be a minimum or a maximum value. Thus, the text match score may be considered as transgressing the threshold text match score as a result of the text match score being higher than the maximum text match score or lower than a minimum text match score.

If, at operation 805, the text anomaly detector 210 determines that the text match score transgresses the threshold text match score, the text anomaly detector 210 determines that an anomaly exists in the updated web document with respect to the updated text, and the decision module 240 determines that an anomaly exists in the updated web document at operation 825. If at operation 805, the text anomaly detector 210 determines the text match score does not transgress the threshold text match score, the method continues to operation 810.

At operation 810, the image anomaly detector 220 compares the image similarity score to a threshold image similarity score to determine whether the image similarity score transgresses the threshold image similarity score. The threshold image similarity score may be a default value set by an administrator of the content publication platform 102 or may be a value refined by the refinement module 250 using machine learning techniques. The threshold image similarity score amount may be a minimum or a maximum value. Thus, the image similarity score may be considered as transgressing the threshold image similarity score as a result of the image similarity score being higher than the maximum image similarity score or lower than a minimum image similarity score.

If, at operation 810, the image anomaly detector 220 determines that the image similarity score transgresses the threshold image similarity score, the image anomaly detector 220 determines that an anomaly exists in the updated web document with respect to the updated image, and the decision module 240 determines that an anomaly exists in the updated web document at operation 825. If, at operation 810, the image anomaly detector 220 determines the image similarity score does not transgress the threshold image similarity score, the method continues to operation 815.

At operation 815, the numerical anomaly detector 230 compares the numerical deviation score to a threshold numerical deviation score to determine whether the numerical deviation score transgresses the threshold numerical deviation score. The threshold numerical deviation score may be a default value set by an administrator of the content publication platform 102 or may be a value refined by the refinement module 250 using machine learning techniques. The threshold numerical deviation score amount may be a minimum or a maximum value. Thus, the numerical deviation score may be considered as transgressing the threshold numerical deviation score as a result of the numerical deviation score being higher than the maximum numerical deviation score or lower than a minimum numerical deviation score.

If, at operation 815, the numerical anomaly detector 230 determines that the numerical deviation score transgresses the threshold numerical deviation score, the numerical anomaly detector 230 determines that an anomaly exists in the updated web document with respect to the updated numerical, and the decision module 240 determines that an anomaly exists in the updated web document at operation 825. If, at operation 815, the numerical anomaly detector 230 determines the numerical deviation score does not transgress the threshold numerical deviation score, the method continues to operation 820 where the decision module 240 determines that no anomaly has been detected in the updated web document.

Figure 9:
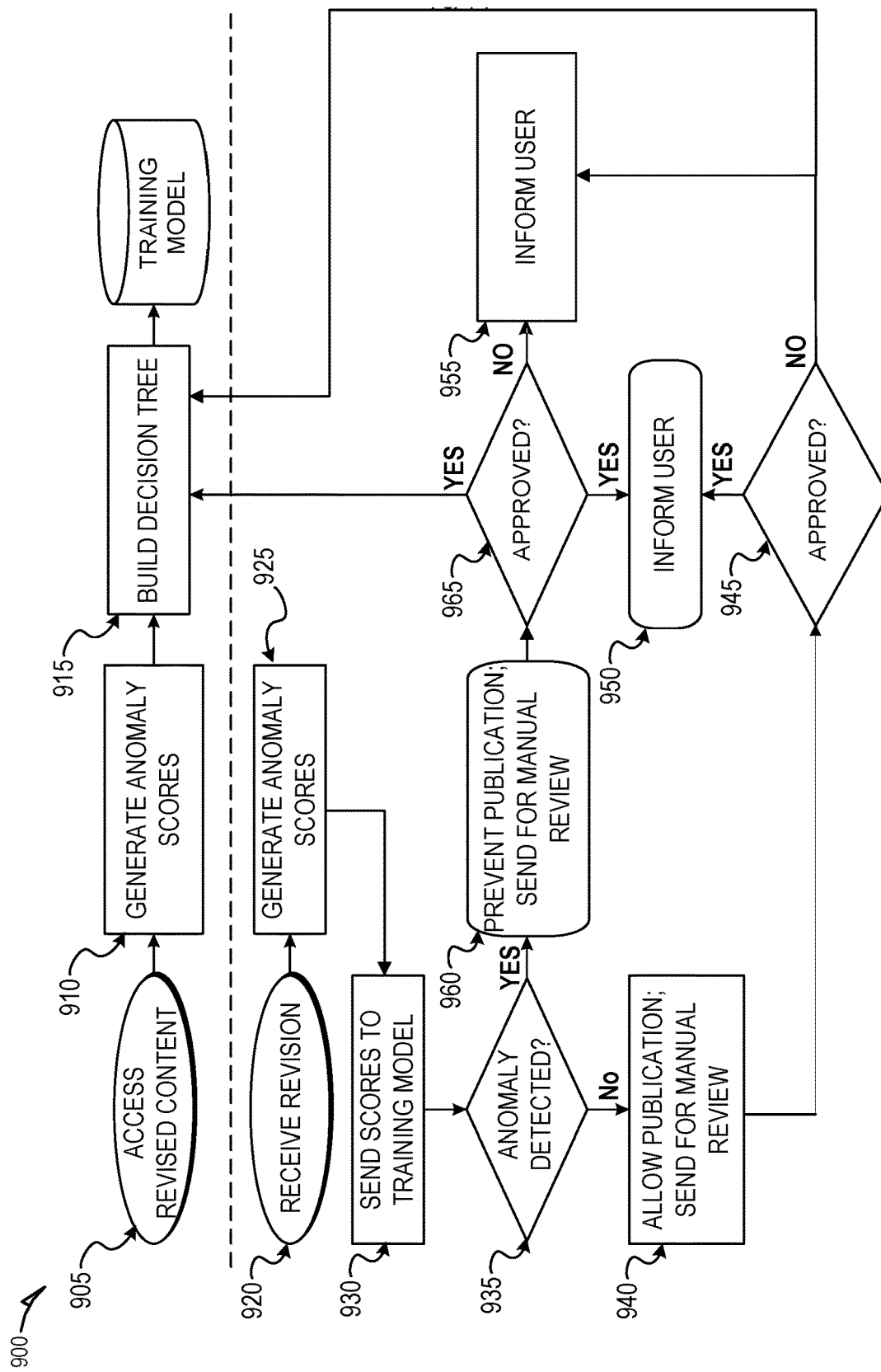
FIG. 9 is a flow chart illustrating example operations of the content publication system in providing a user generated content publication service, according to example embodiments.

FIG. 9 is a flow chart illustrating example operations of the content publication platform 102 in performing a method 900 for providing a user generated content publication service, according to example embodiments. The method 900 may be embodied in computer-readable instructions for execution by one or more processors such that the operations of the method 900 may be performed in part or in whole by the content publication platform 102; accordingly, the method 900 is described below by way of example with reference thereto. However, it shall be appreciated that at least some of the operations of the method 900 may be deployed on various other hardware configurations and the method 900 is not intended to be limited to the content publication platform 102.

At operation 905, the anomaly detection system 144 accesses a corpus of revised web documents (e.g., stored in the database 126). Each revised web document included in the corpus includes at least one revision to a portion of a web document published by the publication system 142.

At operation 910, the anomaly detection system 144 generates anomaly scores (e.g., text match score, image similarity score, and numerical deviation score) for each revised web document. The anomaly detection system 144 may generate the anomaly scores consistent with the methodologies discussed above in reference to FIGS. 4-7.

At operation 915, the refinement module 250 uses the generated anomaly scores to build a decision tree for classification of future revisions. The refinement module 250 also stores the decision tree as a training model, which is stored in the database 126.

At operation 920, the anomaly detection system 144 receives a revision (e.g., an update) to a published web document. The revision may be based on input received from the user 106 via a user interface provided by the content publication platform 102 and displayed on the client device 110.

At operation 925, the anomaly detection system 144 generates one or more anomaly scores for the revised web document. The anomaly detection system 144 generates the anomaly scores consistent with the methodologies discussed above in reference to FIGS. 4-7. At operations 930, the one or more anomaly scores are provided to the refinement module 250 for inclusion in the training model.

At operation 935, the anomaly detection system 144 detects whether an anomaly occurs in the revised web document based on the one or more anomaly scores. If, at operation 935, the anomaly detection system 144 does not detect an anomaly in the revised web document, the anomaly detection system 144 allows the publication system 142 to publish the revised web document at operation 940. At operation 940, the anomaly detection system 144 also transmits the revised web document to a computer device of an administrative user for manual review. The manual review process allows the administrative user (e.g., a human user) to manually assess whether the revised document is anomalous (e.g., includes an anomaly) and provide an approval of the revised web document based on the manual assessment. In other words, the administrative user approves the revised web document if he determines the revised web document does not include an anomaly.

At operation 945, the content publication system platform 102 receives the results of the manual review (e.g., whether the administrative user approves of revised web document). If the administrative user approves the revised web document, the content publication platform 102 informs the user 106 that the revision is allowed and that the revised web document is going to be published. For example, the content publication platform 102 may transmit a message to the client device 110 to inform the user 106 of such.

If the administrative user fails to approve of the revised web document (e.g., because the revised web document is anomalous), the content publication platform 102 informs the user 106 that the revision is not allowed and that the revised web document will not be published, at operation 955. For example, the content publication platform 102 may transmit a message to the client device 110 to inform the user 106 of such.

The content publication platform 102 further provides the results of the manual review to the refinement module 250 for inclusion in the decision tree, and the refinement module 250, in turn, refines the training model. Depending on the particular results of the manual review, the refinement of the training model may, for example, include refining one or more threshold anomaly scores such as the threshold text match score, the threshold image similarity score, or the numerical deviation score. The refining of the one or more threshold anomaly scores may include increasing or decreasing the threshold anomaly scores.

If, at operation 935, the anomaly detection system 144 detects an anomaly in the revised web document, the anomaly detection system 144 prevents the publication system 142 from publishing the revised web document at operation 960. At operation 960, the anomaly detection system 144 also transmits the revised web document to a computer device of an administrative user for manual review. The manual review process allows the administrative user (e.g., a human user) to manually assess whether the revised document is anomalous (e.g., includes an anomaly) and provide an approval of the revised web document based on the manual assessment.

At operation 965, the content publication platform 102 receives the results of the manual review (e.g., whether the administrative user approves of the revised web document 450). If the administrative user does not approve the revised web document (e.g., because the revised web document is anomalous), the content publication platform 102 informs the user 106, at operation 955, that the revision is not allowed and that the revised web document is not being published. For example, the content publication platform 102 may transmit a message to the client device 110 to inform the user 106 of such.

If the administrative user approves of the revised web document 450, the content publication platform 102 provides the results of the manual review to the refinement module 250 for inclusion in the decision tree, and the refinement module 250, in turn, refines the training model. Depending on the particular results of the manual review, the refinement of the training model may, for example, include refining one or more threshold anomaly scores such as the threshold text match score, the threshold image similarity score, or the numerical deviation score. The refining of the one or more threshold anomaly scores may include increasing or decreasing the threshold anomaly scores.

Machine Architecture

Figure 10:
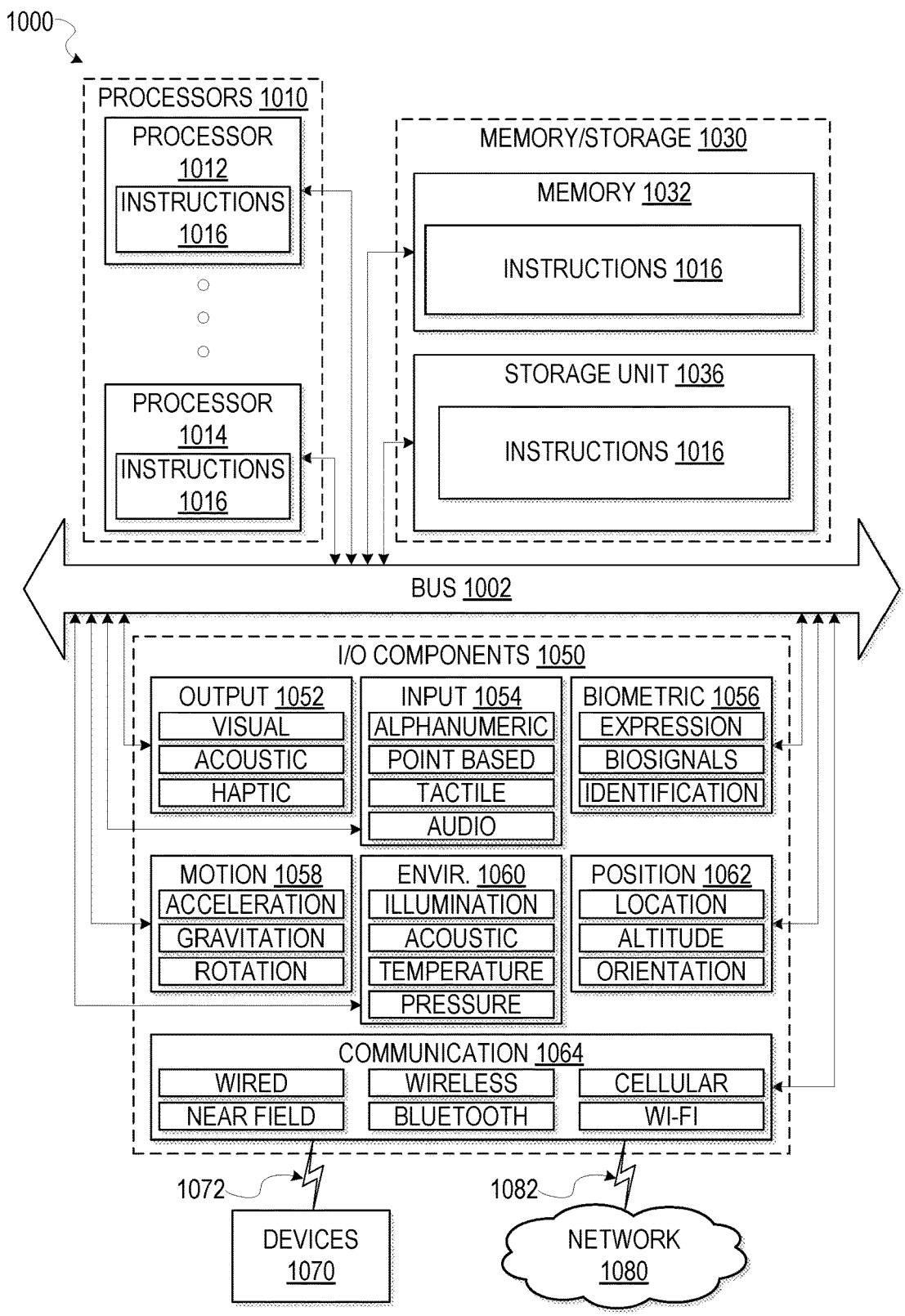
FIG. 10 is a diagrammatic representation of a machine in the example form of a computer system within which a set of instructions for causing the machine to perform any one or more of the methodologies discussed herein may be executed.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may include executable code that causes the machine 1000 to execute any one of the methods 500 or 900. These instructions transform the general, non-programmed machine into a particular machine programmed to carry out the described and illustrated functions of the publication system 142 and the anomaly detection system 144 in the manner described herein. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. By way of non-limiting example, the machine 1000 may comprise or correspond to a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory/storage 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include a multi-core processor 1010 that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core processor), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of the processors 1010 are examples of machine-readable media.

As used herein, "machine-readable medium" means a device able to store instructions and data temporarily or permanently, and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine (e.g., processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), acoustic sensor components (e.g., one or more microphones that detect background noise), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072 respectively. For example, the communication components 1064 may include a network interface component or other suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network 104.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network 104. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Language

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
one or more processors;
a non-transitory computer readable medium storing instructions that, when executed by the one or more processors, cause the system to perform operations comprising:
accessing a published web document comprising a plurality of distinct elements generated using data received from a computing device of a user;
assigning the published web document a first uniform resource identifier (URI), the first URI associates the plurality of distinct elements with a unique identifier;
accessing an updated web document, the updated web document being based on one or more modifications to the published web document made by the user using an interface presented on a computing device of the user, the updated web document including at least one user generated modification to a distinct element of the plurality of distinct elements of the published web document;

generating one or more anomaly scores based on a comparison of the updated web document to the published web document, the one or more anomaly scores providing a measure of deviation of the updated web document from the published web document; and determining whether to allow publication of the updated web document based on a result of a comparison of the anomaly score to a threshold anomaly score, the determining includes determining whether to assign the first URI to the updated web document.

2. The system of claim 1, wherein the plurality of distinct elements of the published web document include text, an image, and a numerical value.

3. The system of claim 1, wherein generating the one or more anomaly scores comprises:
performing a comparison of updated text included in the updated web document with published text included in the published web document;
generating a text match score based on the comparison, the text match score providing a measure of similarity between the updated text and the published text,
wherein the one or more anomaly scores include the text match score.

4. The system of claim 3, wherein performing the comparison comprises using a cosine similarity algorithm to determine the similarity between the updated text and the published text.

5. The system of claim 1, wherein generating the one or more anomaly scores comprises:
performing a comparison of a published image included in the published web document with a updated image included in the updated web document; and
generating an image similarity score based on the comparison, the image similarity score providing a measure of similarity between the published image and the updated image,
wherein the one or more anomaly scores include the image similarity score.

6. The system of claim 5, wherein the performing of the comparison comprises:
extracting a first set of feature descriptors based on the published image;
storing the first set of feature descriptors in a first matrix corresponding to the published image;
extracting a second set of feature descriptors based on the updated image;
storing the second set of feature descriptors in a second matrix corresponding to the updated image; and
comparing the first matrix to the second matrix,
wherein the generating of the image similarity score is based on the comparing of the first matrix to the second matrix.

7. The system of claim 1, wherein:
the generating of the one or more anomaly scores includes generating a numerical deviation score based on a difference between a updated numerical value included in the updated web document and an average of numerical values associated with the web document; and
the one or more anomaly scores includes the numerical deviation score.

8. The system of claim 1, wherein the generating of the one or more anomaly scores comprises:
generating a text match score based on a comparison of updated text included in the updated web document with published text included in the published web document;
generating an image similarity score based on a comparison of an updated image included in the updated web document with a published image included in the published web page;
generating a numerical deviation score based on a difference between an updated numerical value included in the updated web document and an average of numerical values associated with the web document; and
aggregating the text match score, the image similarity score, and the numerical deviation score to generate the anomaly score, the aggregating includes summing the text match score, the image similarity score, and the numerical deviation score to obtain the anomaly score.

9. The system of claim 1, wherein the determining of whether to allow publication of the updated web document based on the result of the comparison of the anomaly score to the threshold anomaly score includes preventing publication of the updated web document in response to the anomaly score transgressing the threshold anomaly score.

10. The system of claim 9, further comprising:
transmitting the updated web document for to a device of an administrator manual review by an administrator; and
refining the one or more threshold anomaly scores based on a result of the manual review of the administrator.

11. The system of claim 1, further comprising receiving, from an administrative computer system, an approval of the updated web document as the result of the manual review,
wherein the refining of the threshold anomaly score includes increasing the threshold anomaly score based on the approval of the updated web document as the result of the manual review.

12. The system of claim 9, further comprising:
generating a message indicating that the updated web document is anomalous; and
transmitting the message to a client device of the user responsible for providing the updated web document.

13. The system of claim 1, wherein the determining whether to allow publication of the updated web document based on the result of the comparison of the anomaly score to the threshold anomaly score includes publishing the updated web document in response to the anomaly score failing to transgress the threshold anomaly score.

14. A method comprising:
accessing a web document comprising a plurality of distinct elements generated using data received from a computing device of a user;
assigning the web document a first uniform resource identifier (URI), the first URI associates the plurality of distinct elements with a unique identifier;
accessing an updated web document, the updated web document being based on one or more modifications to the published web document made by the user using an interface presented on a computing device of the user, the updated web document including at least one user generated modification to a distinct element of the plurality of distinct elements of the published web document;
generating, using one or more processors, one or more anomaly scores based on a comparison of the updated web document to the published web document, the one or more anomaly scores providing a measure of deviation of the updated web document from the published web document; and determining whether to allow publication of the updated web document based on a result of a comparison of the anomaly score to a threshold anomaly score, the determining includes determining whether to assign the first URI to the updated web document.

15. The method of claim 14, wherein the generating of the one or more anomaly scores comprises:

generating a text match score based on a comparison of updated text included in the updated web document with published text included in the published web document;

generating an image similarity score based on a comparison of an updated image included in the updated web document with a published image included in the published web page;

generating a deviation score based on a difference between an updated numerical value included in the updated web document and an average of numerical values associated with the web document; and aggregating the text match score, the image similarity score, and the deviation score to generate the anomaly score.

16. The method of claim 14, wherein generating the one or more anomaly scores comprises:

performing a comparison of updated text included in the updated web document with published text included in the published web document; and generating a text match score based on the comparison, the text match score providing a measure of similarity between the updated text and the published text, wherein the one or more anomaly scores includes the text match score.

17. The method of claim 14, wherein generating the one or more anomaly scores comprises:

performing a comparison of a published image included in the published web document with a updated image included in the updated web document; and generating an image similarity score based on the comparison, the image similarity score providing a measure of similarity between the published image and the updated image, wherein the one or more anomaly scores includes the image similarity score.

18. The method of claim 17, wherein the performing of the comparison comprises:

extracting a first set of feature descriptors based on the published image;

storing the first set of feature descriptors in a first matrix corresponding to the published image;

extracting a second set of feature descriptors based on the updated image;

storing the second set of feature descriptors in a second matrix corresponding to the updated image; and comparing the first matrix to the second matrix, wherein the generating of the image similarity score is based on the comparing of the first matrix to the second matrix.

19. The method of claim 14, wherein:

the generating of the one or more anomaly scores includes generating a numerical deviation score based on a difference between a updated numerical value included in the updated web document and an average of numerical values associated with the web document; and the one or more anomaly scores includes the numerical deviation score.

20. A non-transitory machine-readable storage medium embodying instructions that, when executed by a machine, cause the machine to perform operations comprising:

publishing a web document comprising a plurality of distinct elements generated using data received from a computing device of a user;

assigning the web document a first uniform resource identifier (URI), the first URI associates the plurality of distinct elements with a unique identifier;

accessing an updated web document, the updated web document being based on one or more modifications to the published web document made by the user using an interface presented on a computing device of the user, the updated web document including at least one user generated modification to a distinct element of the plurality of distinct elements of the published web document;

generating one or more anomaly scores based on a comparison of the updated web document to the published web document, the one or more anomaly scores providing a measure of deviation of the updated web document from the published web document; and determining whether to allow publication of the updated web document based on a result of a comparison of the anomaly score to a threshold anomaly score, the determining includes determining whether to assign the first URI to the updated web document.

* * * * *